(12) United States Patent
Lu et al.

(10) Patent No.: US 10,385,204 B2
(45) Date of Patent: Aug. 20, 2019

(54) BIODEGRADABLE POLYESTER COMPOSITION

(71) Applicant: Hongmei Yang, Guangdong (CN)

(72) Inventors: Changli Lu, Guangdong (CN); Zhimin Yuan, Guangdong (CN); Tongmin Cai, Guangdong (CN); Xianbo Huang, Guangdong (CN); Xiangbin Zeng, Guangdong (CN); Jian Jiao, Guangdong (CN); Renxu Yuan, Guangdong (CN); Yuke Zhong, Guangdong (CN); Kai Xiong, Guangdong (CN); Hui Yang, Guangdong (CN); Kaijin Mai, Guangdong (CN); Xueteng Dong, Guangdong (CN)

(73) Assignee: Hongmei Yang, Guangdong (CN)

( * ) Notice: Subject to any disclaimer, the term of this patent is extended or adjusted under 35 U.S.C. 154(b) by 0 days.

(21) Appl. No.: 15/578,252

(22) PCT Filed: Feb. 24, 2017

(86) PCT No.: PCT/CN2017/074667
§ 371 (c)(1),
(2) Date: Nov. 30, 2017

(87) PCT Pub. No.: WO2017/152771
PCT Pub. Date: Sep. 14, 2017

(65) Prior Publication Data
US 2018/0148573 A1 May 31, 2018

(30) Foreign Application Priority Data
Mar. 7, 2016 (CN) .......................... 2016 1 0126863

(51) Int. Cl.
| | |
|---|---|
| C08G 63/02 | (2006.01) |
| C08L 67/02 | (2006.01) |
| C08K 5/156 | (2006.01) |
| C08L 3/02 | (2006.01) |
| C08L 25/14 | (2006.01) |
| C08L 67/04 | (2006.01) |
| C08K 3/26 | (2006.01) |
| C08K 3/34 | (2006.01) |

(52) U.S. Cl.
CPC .............. *C08L 67/02* (2013.01); *C08K 3/26* (2013.01); *C08K 3/34* (2013.01); *C08K 5/156* (2013.01); *C08L 3/02* (2013.01); *C08L 25/14* (2013.01); *C08L 67/04* (2013.01); *C08K 2003/265* (2013.01); *C08L 2201/06* (2013.01); *C08L 2201/08* (2013.01); *C08L 2203/16* (2013.01); *C08L 2205/02* (2013.01); *C08L 2205/03* (2013.01); *C08L 2205/035* (2013.01)

(58) Field of Classification Search
USPC .......................... 528/190, 193, 194; 525/165
See application file for complete search history.

(56) References Cited

U.S. PATENT DOCUMENTS

| | | | | |
|---|---|---|---|---|
| 2011/0237750 | A1* | 9/2011 | Ren ....................... | C08G 63/183 525/173 |
| 2012/0288650 | A1* | 11/2012 | Freese ..................... | C08K 3/26 428/35.5 |
| 2013/0029124 | A1* | 1/2013 | Loos ...................... | C08L 67/02 428/220 |

FOREIGN PATENT DOCUMENTS

| | | |
|---|---|---|
| CN | 102639594 | 8/2012 |
| CN | 102942770 | 2/2013 |
| CN | 103627153 | 3/2014 |
| CN | 103687902 | 3/2014 |
| CN | 104479304 | 4/2015 |
| CN | 104744898 | 7/2015 |
| CN | 105585825 | 5/2016 |
| JP | S6067550 | 4/1985 |
| WO | 2009071475 | 6/2009 |

OTHER PUBLICATIONS

"International Search Report (Form PCT/ISA/210)", dated Jun. 1, 2017, with English translation thereof, pp. 1-6.

* cited by examiner

*Primary Examiner* — Terressa Boykin
(74) *Attorney, Agent, or Firm* — JCIPRNET

(57) ABSTRACT

A biodegradable polyester composition based on a total weight of the biodegradable polyester composition, including a weight content of a cyclic ester compound having a structure shown as formula (I), which is 100 ppm-950 ppm is provided. The cyclic ester compound is added into the composition and controlling the content of the cyclic ester compound in a range of 100 ppm-950 ppm to realize an anti-thermal oxidative aging property of the biodegradable polyester composition. In addition, a film is prepared by blow molding or a part prepared by injection molding after being digested with 95% ethanol at 40° C. for 240 hours.

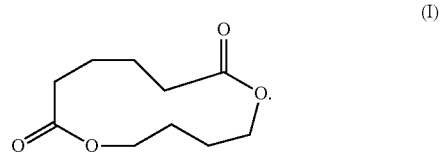

(I)

23 Claims, No Drawings

BIODEGRADABLE POLYESTER COMPOSITION

CROSS-REFERENCE TO RELATED APPLICATION

This application is a 371 of international application of PCT application serial no. PCT/CN2017/074667, filed on Feb. 24, 2017, which claims the priority benefit of China application no. 201610126863.2, filed on Mar. 7, 2016. The entirety of each of the abovementioned patent applications is hereby incorporated by reference herein and made a part of this specification.

TECHNICAL FIELD

The present invention belongs to a field of modification of macromolecule material, and specifically relates to a biodegradable polyester composition with an excellent anti-thermal oxidative aging property and an excellent surface appearance property.

BACKGROUND

Biodegradable polyester is a kind of macromolecule material using biological resources as raw materials. With respect to a petroleum-based polymer using petrochemical resources as raw materials, the biodegradable polyester can be degraded during a process of biological or biochemical effect or in a biological environment, being a very active degradable material in the present biodegradable plastic research and one of the best degradable materials in market application.

However, owing to effects of microorganism, illumination, radiation, atmosphere and contacted physical environment, a molding product prepared with the biodegradable polyester is relatively easy to age and degrade during storage and use, which hugely influences service performance of the product. A conventional method that solves the aging and the degradation of macromolecule material includes adding an antioxidant, a UV absorbent, a HALS stabilizer and the like into the material. For example, patent WO 2009/071475 discloses a mulching film of polyethylene which contains hydroxyphenyltriazines as the stabilizer. CN 103687902 introduces the UV absorbent and the HALS stabilizer, or a light stabilizer combining both, for providing the mulching film with UV stability. Although the above stabilizers can provide certain stabilization, they are definitely not satisfactory for a transparent mulching film, especially for that with a relatively low wall thickness.

Besides, under a condition that the molding product prepared with the biodegradable polyester composition is digested with 95% ethanol, there will be a precipitate separating out of a surface of a film or a part of the molding product, which thus influences a surface appearance property of the film or the part.

The present invention surprisingly finds by research that by adding a trace amount of a cyclic ester compound in the biodegradable polyester composition, an anti-oxidative property of the biodegradable polyester composition can be enormously enhanced, and meanwhile it can be guaranteed that the biodegradable polyester composition has an excellent surface appearance property.

SUMMARY OF THE INVENTION

An objective of the present invention is to provide a biodegradable polyester composition. By adding a trace amount of a cyclic ester compound into the composition, the prepared biodegradable polyester composition is enabled to have an excellent anti-thermal oxidative aging property and an excellent surface appearance property.

The present invention is realized by following technical solution:

a biodegradable polyester composition comprises following components in parts by weight:
 i) 60 to 100 parts of biodegradable aliphatic-aromatic polyester;
 ii) 0 to 40 parts of polylactic acid;
 iii) 0 to 35 parts of an organic filler and/or an inorganic filler;
 iv) 0 to 1 part of a copolymer which contains epoxy group and is based on styrene, acrylate and/or methacrylate;
wherein based on a total weight of the biodegradable polyester composition, a weight content of a cyclic ester compound having a structure shown as formula (I) is 100 ppm-950 ppm, preferably 160 ppm-750 ppm, and more preferably 210 ppm-540 ppm;

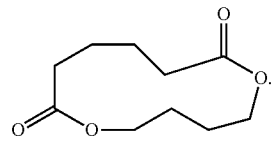

(I)

Preferably, the biodegradable polyester composition comprises following components in parts by weight:
 i) 65 to 95 parts of the biodegradable aliphatic-aromatic polyester;
 ii) 5 to 35 parts of the polylactic acid;
 iii) 5 to 25 parts of the organic filler and/or the inorganic filler;
 iv) 0.02 to 0.5 part of the copolymer which contains epoxy group and is based on styrene, acrylate and/or methacrylate.

The weight content of the cyclic ester compound according to the present invention is measured by a method as follows: 1.2000 g of the biodegradable polyester composition is weighed accurately, added into a 25 ml volumetric flask, and dissolved by adding chloroform; after the biodegradable polyester composition is dissolved completely, it is diluted to 25 ml; a peak area of the cyclic ester compound in the prepared solution is measured by a GC-MS test; the content of the cyclic ester compound in the biodegradable polyester composition is calculated according to the peak area of the cyclic ester compound in the prepared solution and a standard curve of the cyclic ester compound; and the standard curve is calibrated by a solution of the cyclic ester compound/chloroform.

The biodegradable aliphatic-aromatic polyester is one or more of poly(butyleneadipate-co-terephthalate) (PBAT), poly(butylenesuccinate-co-terephthalate) (PBST) and poly(butylenesebacate-co-terephthalate) (PBSeT). Addition of the cyclic ester compound helps to extend a service life of the biodegradable polyester composition. However, if the content of the cyclic ester compound in the biodegradable polyester composition is too high, the cyclic ester compound will separate out of a surface of a film or a part under a condition of being digested with 95% ethanol, which influences the surface appearance property of the film or the part. By research, the present invention finds that controlling the content of the cyclic ester compound in the biodegradable polyester composition at 100 ppm-950 ppm may not only guarantee the biodegradable polyester composition having a good anti-thermal oxidative aging property, but also guarantee the prepared film or the prepared part having an excellent surface appearance property. Based on a total weight of the biodegradable polyester composition, the weight content of the cyclic ester compound is preferably 160 ppm-750 ppm, and more preferably 210 ppm-540 ppm.

The organic filler is selected from a group consisting of natural starch, plasticized starch, modified starch, natural fiber and wood flour, or a mixture thereof. The inorganic filler is selected from a group consisting of talcum powder, montmorillonite, kaolin, chalk, calcium carbonate, graphite, gypsum, conductive carbon black, calcium chloride, ferric oxide, dolomite, silicon dioxide, wollastonite, titanium dioxide, silicate, mica, glass fiber and mineral fiber, or a mixture thereof.

A route of acquiring the cyclic ester compound in the present invention may be by means of adding the cyclic ester compound directly during blending, extruding and processing the biodegradable polyester composition.

According to different needs of use, the biodegradable polyester composition according to the present invention may be further added with 0 to 4 parts of at least one of following substances: plasticizer, release agent, surfactant, wax, antistatic agent, pigment, UV absorbent, UV stabilizer and other plastic additives.

The plasticizer is one of or a mixture of two or more of tributyl citrate, glycerol, epoxidized soybean oil and the like.

The release agent is one of or a mixture of two or more of silicone oil, paraffin, white mineral oil and Vaseline.

The surfactant is one of or a mixture of two or more of polysorbate, palmitate and laurate.

The wax is one of or a mixture of two or more of erucamide, stearamide, behenamide, beeswax and beeswax ester.

The antistatic agent is a permanent antistatic agent, specifically listed as one of or a mixture of two or more of PELESTAT-230, PELESTAT-6500 and SUNNICO ASA-2500.

The pigment is one of or a mixture of two or more of carbon black, black masterbatch, titanium dioxide, zinc sulfide, phthalocyanine blue and fluorescent orange.

The UV adsorbent is one or more of UV-944, UV-234, UV-531 and UV-326.

The UV stabilizer is one or more of UV-123, UV-3896 and UV-328.

The other plastic additives may be a nucleating agent, an antifogging agent and the like.

The biodegradable polyester composition according to the present invention may be used for preparing shopping bag, compost bag, mulching film, protective cover film, silo film, film strip, fabric, non-fabric, textile, fishing net, bearing bag, garbage bag and the like.

Compared to the prior art, the present invention has following beneficial effects:

In the present invention, by adding the cyclic ester compound into the composition and controlling the content of the cyclic ester compound in the composition in a range of 100 ppm-950 ppm, the anti-thermal oxidative aging property of the biodegradable polyester composition may be greatly improved. In addition, after being digested with 95% ethanol at 40° C. for 240 hours, the film prepared by blow molding or the part prepared by injection molding has little precipitate separating out of the surface and has an excellent surface appearance property.

DETAILED DESCRIPTION OF THE PREFERRED EMBODIMENT

The present invention will be further described below by way of specific implementations, and the following embodiments are preferred implementations of the present invention, but the implementations of the present invention are not limited by the following embodiments.

In the embodiments of the present invention, PBAT is chosen as a component i), ADR4370 is chosen as a component iv), starch is chosen as an organic filler, talcum powder and calcium carbonate are chosen as inorganic fillers, tributyl citrate is chosen as a plasticizer, palmitate is chosen as a surfactant, and stearamide is chosen as a wax. The above-mentioned promoters, PBAT, ADR4370, PLA and cyclic ester compound are commercially available.

Embodiments 1-16 and Comparative Embodiments 1-2 according to formulas shown in Table 1, PBAT, PLA, ADR4370, organic fillers, inorganic fillers, promoters such as plasticizer, surfactant, wax and the like, and a cyclic ester compound were mixed evenly and put into a single screw extruder. After being extruded at 140° C.-240° C. and prilled, the compositions were obtained. Data of performance tests is shown in Table 1.

Performance Evaluation Method:

(1) Evaluation Method for Anti-Thermal Oxidative Aging Property of a Biodegradable Polyester Composition:

the biodegradable polyester composition was sealed in a non-vacuum aluminum foil bag. The aluminum foil bag was put in an air dry oven at 70° C. to perform a thermal oxidative aging test. Samples were taken every 3 days for testing a melting index (190° C./2.16 kg, according to ISO 1133). When the melting index of the sample was beyond a normal melting index range of the biodegradable polyester composition, it indicated that an obvious thermal oxidative aging degradation had occurred in the biodegradable polyester composition. A test time that the obvious thermal oxidative aging degradation occurred in the biodegradable polyester composition was recorded. The shorter the test time was, the poorer the anti-thermal oxidative aging property of the biodegradable polyester composition was indicated.

(2) Evaluation Method for a Surface Appearance Property of a Molding Product:

a 2 mm palette was injection molded and put into a solution of 95% ethanol at 40° C. for being digested for 240 hours, followed by being placed in a standard laboratory with an atmosphere temperature of (23±2) ° C. and a relative humidity of 45%-55%. After the palette was adjusted for 48 hours, ΔL, a variation of L-value of the palette before treatment and after treatment, was measured via a colorimeter. The greater the ΔL was, the more the precipitate separated out of the surface and the poorer the surface appearance property was.

(3) Determination Method for the Cyclic Ester Compound:

1.2000 g of the biodegradable polyester composition was weighed accurately, added into a 25 ml volumetric flask, and dissolved by adding chloroform. After the biodegradable polyester composition was dissolved completely, it was diluted to volume. A peak area of the cyclic ester compound in the prepared solution was measured by a GC-MS test. The content of the cyclic ester compound in the biodegradable polyester composition was calculated according to the peak area of the cyclic ester compound in the prepared solution and a standard curve of the cyclic ester compound. The standard curve was calibrated by a solution of the cyclic ester compound/chloroform.

Models and parameters for GC-MS are as follows:
Agilent Technologies 7693 AutoSampler;
Agilent Technologies 5975C inert MSD with Triple-Axis Detector;
Chromatographic column: J&W 122-5532 UI: 350° C.: 30 m×250 μm×0.25 μm
Sample injection: front SS injection port He (helium)
Sample production: vacuum.

TABLE 1

Test data of Comparative Embodiments 1-2 and Embodiments 1-16 (parts by weight)

|  | Comparative Embodiment 1 | Comparative Embodiment 2 | Embodiment 1 | Embodiment 2 | Embodiment 3 | Embodiment 4 |
|---|---|---|---|---|---|---|
| PBAT | 84.1 | 84.1 | 100 | 84.1 | 84.1 | 84.1 |
| PLA | 10 | 10 |  | 10 | 10 | 10 |
| starch |  |  |  |  |  |  |
| talcum power | 1.6 | 1.6 |  | 1.6 | 1.6 | 1.6 |
| calcium carbonate | 3.5 | 3.5 |  | 3.5 | 3.5 | 3.5 |
| ADR4370 | 0.3 | 0.3 |  | 0.3 | 0.3 | 0.3 |
| tributyl citrate |  |  |  |  |  |  |
| palmitate |  |  |  |  |  |  |
| stearamide | 0.5 | 0.5 |  | 0.5 | 0.5 | 0.5 |
| content of the cyclic ester compound (based on the whole composition)/ppm | 54 | 1152 | 100 | 215 | 282 | 316 |
| time for thermal oxidative aging/day | 6 | 9 | 12 | 23 | 27 | 28 |
| ΔL | 0.08 | 1.06 | 0.09 | 0.19 | 0.22 | 0.27 |

|  | Embodiment 5 | Embodiment 6 | Embodiment 7 | Embodiment 8 |
|---|---|---|---|---|
| PBAT | 84.1 | 84.1 | 67 | 66.5 |
| PLA | 10 | 10 | 15 | 32 |
| starch |  |  | 17 |  |
| talcum power | 1.6 | 1.6 |  |  |
| calcium carbonate | 3.5 | 3.5 |  |  |
| ADR4370 | 0.3 | 0.3 | 0.3 | 0.5 |
| tributyl citrate |  |  | 0.2 |  |
| palmitate |  |  |  | 0.5 |
| stearamide | 0.5 | 0.5 | 0.5 | 0.5 |
| content of the cyclic ester compound (based on the whole composition)/ppm | 408 | 437 | 495 | 540 |
| time for thermal oxidative aging/day | 28 | 29 | 29 | 30 |
| ΔL | 0.29 | 0.34 | 0.35 | 0.36 |

|  | Embodiment 9 | Embodiment 10 | Embodiment 11 | Embodiment 12 | Embodiment 13 | Embodiment 14 | Embodiment 15 | Embodiment 16 |
|---|---|---|---|---|---|---|---|---|
| PBAT | 84.1 | 84.1 | 84.1 | 84.1 | 84.1 | 84.1 | 84.1 | 84.1 |
| PLA | 10 | 10 | 10 | 10 | 10 | 10 | 10 | 10 |
| starch |  |  |  |  |  |  |  |  |
| talcum power | 1.6 | 1.6 | 1.6 | 1.6 | 1.6 | 1.6 | 1.6 | 1.6 |
| calcium carbonate | 3.5 | 3.5 | 3.5 | 3.5 | 3.5 | 3.5 | 3.5 | 3.5 |
| ADR4370 | 0.3 | 0.3 | 0.3 | 0.3 | 0.3 | 0.3 | 0.3 | 0.3 |
| tributyl citrate |  |  |  |  |  |  |  |  |
| palmitate |  |  |  |  |  |  |  |  |
| stearamide | 0.5 | 0.5 | 0.5 | 0.5 | 0.5 | 0.5 | 0.5 | 0.5 |
| content of the cyclic ester compound/ppm | 160 | 174 | 671 | 750 | 100 | 135 | 839 | 950 |

TABLE 1-continued

Test data of Comparative Embodiments 1-2 and Embodiments 1-16 (parts by weight)

| | | | | | | | | |
|---|---|---|---|---|---|---|---|---|
| time for thermal oxidative aging/day | 18 | 20 | 21 | 22 | 13 | 15 | 16 | 16 |
| ΔL | 0.40 | 0.38 | 0.61 | 0.65 | 0.69 | 0.71 | 0.75 | 0.79 |

It can be seen from Table 1 that, when the content of the cyclic ester compound in the biodegradable polyester composition is 100-950 ppm, the biodegradable polyester composition has better anti-thermal oxidative aging property. Besides, after the biodegradable polyester composition is digested with 95% ethanol at 40° C. for 240 hours, ΔL is less than 0.80, which indicates that the composition has excellent surface appearance property. When the content of the cyclic ester compound in Comparative Embodiment 1 is less than 100 ppm, though ΔL of the composition is relatively low, the time for thermal oxidative aging of the composition is relatively short. When the content of the cyclic ester compound in Comparative Embodiment 2 is beyond 950 ppm, ΔL reaches above 1.0, which indicates that there is more precipitate separating out of the surface and the surface appearance property of the composition is poor.

What is claimed is:

1. A biodegradable polyester composition comprising the following components in parts by weight:
   i) 60 to 100 parts of biodegradable aliphatic-aromatic polyester;
   ii) 0 to 40 parts of polylactic acid;
   iii) 0 to 35 parts of an organic filler and/or an inorganic filler;
   iv) 0 to 1 part of a copolymer which contains epoxy group and is based on styrene, acrylate and/or methacrylate; and
   wherein based on a total weight of the biodegradable polyester composition, a weight content of a cyclic ester compound having a structure shown as formula (I) is 100 ppm-950 ppm;

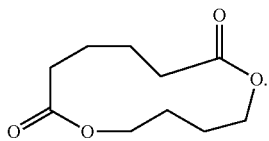

(I)

2. The biodegradable polyester composition according to claim 1, wherein based on the total weight of the biodegradable polyester composition, the weight content of the cyclic ester compound having the structure shown as formula (I) is 160 ppm-750 ppm.

3. The biodegradable polyester composition according to claim 1, comprising the following components in parts by weight:
   i) 65 to 95 parts of the biodegradable aliphatic-aromatic polyester;
   ii) 5 to 35 parts of the polylactic acid;
   iii) 5 to 25 parts of the organic filler and/or the inorganic filler;
   iv) 0.02 to 0.5 part of the copolymer which contains epoxy group and is based on styrene, acrylate and/or methacrylate.

4. The biodegradable polyester composition according to claim 2, wherein the weight content of the cyclic ester compound is measured by a method as follows: 1.2000 g of the biodegradable polyester composition is weighed accurately, added into a 25 ml volumetric flask, and dissolved by adding chloroform; after the biodegradable polyester composition is dissolved completely, the biodegradable polyester composition is diluted to 25 ml; a peak area of the cyclic ester compound in the prepared solution is measured by a GC-MS test; the content of the cyclic ester compound in the biodegradable polyester composition is calculated according to the peak area of the cyclic ester compound in the prepared solution and a standard curve of the cyclic ester compound; and the standard curve is calibrated by a solution of the cyclic ester compound/chloroform.

5. The biodegradable polyester composition according to claim 1, wherein the biodegradable aliphatic-aromatic polyester is one or more of poly(butyleneadipate-co-terephthalate) (PBAT), poly(butylenesuccinate-co-terephthalate) (PBST) and poly(butylenesebacate-co-terephthalate) (PBSeT).

6. The biodegradable polyester composition according to claim 1, wherein the organic filler is selected from a group consisting of natural starch, plasticized starch, modified starch, natural fiber and wood flour, or a mixture thereof; and the inorganic filler is selected from a group consisting of talcum powder, montmorillonite, kaolin, chalk, calcium carbonate, graphite, gypsum, conductive carbon black, calcium chloride, ferric oxide; dolomite, silicon dioxide, wollastonite, titanium dioxide, silicate, mica, glass fiber and mineral fiber, or a mixture thereof.

7. The biodegradable polyester composition according to claim 1, further comprising 0 to 4 parts of at least one of following substances: plasticizer, release agent, surfactant, wax, antistatic agent, pigment, UV absorbent, UV stabilizer and other plastic additives.

8. The biodegradable polyester composition according to claim 2, wherein the biodegradable polyester composition is sealed in a non-vacuum aluminum foil bag, and a time of thermal oxidative aging for putting the aluminum foil bag in an air dry oven at 70° C. for conducting a thermal oxidative aging test is equal to or more than 10 days.

9. The biodegradable polyester composition according to claim 2, wherein a ΔL value of the biodegradable polyester composition is less than 0.80 after the biodegradable polyester composition is digested with 95% ethanol at 40° C. for 240 hours.

10. The biodegradable polyester composition according to claim 2, comprising the following components in parts by weight:
   i) 65 to 95 parts of the biodegradable aliphatic-aromatic polyester;
   ii) 5 to 35 parts of the polylactic acid;
   iii) 5 to 25 parts of the organic filler and/or the inorganic filler;

iv) 0.02 to 0.5 part of the copolymer which contains epoxy group and is based on styrene, acrylate and/or methacrylate.

11. The biodegradable polyester composition according to claim 3, wherein the weight content of the cyclic ester compound is measured by a method as follows: 1.2000 g of the biodegradable polyester composition is weighed accurately, added into a 25 ml volumetric flask, and dissolved by adding chloroform; after the biodegradable polyester composition is dissolved completely, the biodegradable polyester composition is diluted to 25 ml; a peak area of the cyclic ester compound in the prepared solution is measured by a GC-MS test; the content of the cyclic ester compound in the biodegradable polyester composition is calculated according to the peak area of the cyclic ester compound in the prepared solution and a standard curve of the cyclic ester compound; and the standard curve is calibrated by a solution of the cyclic ester compound/chloroform.

12. The biodegradable polyester composition according to claim 10, wherein the weight content of the cyclic ester compound is measured by a method as follows: 1.2000 g of the biodegradable polyester composition is weighed accurately, added into a 25 ml volumetric flask, and dissolved by adding chloroform; after the biodegradable polyester composition is dissolved completely, the biodegradable polyester composition is diluted to 25 ml; a peak area of the cyclic ester compound in the prepared solution is measured by a GC-MS test; the content of the cyclic ester compound in the biodegradable polyester composition is calculated according to the peak area of the cyclic ester compound in the prepared solution and a standard curve of the cyclic ester compound; and the standard curve is calibrated by a solution of the cyclic ester compound/chloroform.

13. The biodegradable polyester composition according to claim 2, wherein the biodegradable aliphatic-aromatic polyester is one or more of poly(butyleneadipate-co-terephthalate) (PBAT), poly(butylenesuccinate-co-terephthalate) (PBST) and poly(butylenesebacate-co-terephthalate) (PBSeT).

14. The biodegradable polyester composition according to claim 3, wherein the biodegradable aliphatic-aromatic polyester is one or more of poly(butyleneadipate-co-terephthalate) (PBAT), poly(butylenesuccinate-co-terephthalate) (PBST) and poly(butylenesebacate-co-terephthalate) (PBSeT).

15. The biodegradable polyester composition according to claim 10, wherein the biodegradable aliphatic-aromatic polyester is one or more of poly(butyleneadipate-co-terephthalate) (PBAT), poly(butylenesuccinate-co-terephthalate) (PBST) and poly(butylenesebacate-co-terephthalate) (PBSeT).

16. The biodegradable polyester composition according to claim 2, wherein the organic filler is selected from a group consisting of natural starch, plasticized starch, modified starch, natural fiber and wood flour, or a mixture thereof; and the inorganic filler is selected from a group consisting of talcum powder, montmorillonite, kaolin, chalk, calcium carbonate, graphite, gypsum, conductive carbon black, calcium chloride, ferric oxide, dolomite, silicon dioxide, wollastonite, titanium dioxide, silicate, mica, glass fiber and mineral fiber, or a mixture thereof.

17. The biodegradable polyester composition according to claim 3, wherein the organic filler is selected from a group consisting of natural starch, plasticized starch, modified starch, natural fiber and wood flour, or a mixture thereof; and the inorganic filler is selected from a group consisting of talcum powder, montmorillonite, kaolin, chalk, calcium carbonate, graphite, gypsum, conductive carbon black, calcium chloride, ferric oxide, dolomite, silicon dioxide, wollastonite, titanium dioxide, silicate, mica, glass fiber and mineral fiber, or a mixture thereof.

18. The biodegradable polyester composition according to claim 10, wherein the organic filler is selected from a group consisting of natural starch, plasticized starch, modified starch, natural fiber and wood flour, or a mixture thereof; and the inorganic filler is selected from a group consisting of talcum powder, montmorillonite, kaolin, chalk, calcium carbonate, graphite, gypsum, conductive carbon black, calcium chloride, ferric oxide, dolomite, silicon dioxide, wollastonite, titanium dioxide, silicate, mica, glass fiber and mineral fiber, or a mixture thereof.

19. The biodegradable polyester composition according to claim 2, further comprising 0 to 4 parts of at least one of following substances: plasticizer, release agent, surfactant, wax, antistatic agent, pigment, UV absorbent, UV stabilizer and other plastic additives.

20. The biodegradable polyester composition according to claim 3, further comprising 0 to 4 parts of at least one of following substances: plasticizer, release agent, surfactant, wax, antistatic agent, pigment, UV absorbent, UV stabilizer and other plastic additives.

21. The biodegradable polyester composition according to claim 10, further comprising 0 to 4 parts of at least one of following substances: plasticizer, release agent, surfactant, wax, antistatic agent, pigment, UV absorbent, UV stabilizer and other plastic additives.

22. The biodegradable polyester composition according to claim 4, wherein the biodegradable polyester composition is sealed in a non-vacuum aluminum foil bag, and a time of thermal oxidative aging for putting the aluminum foil bag in an air dry oven at 70° C. for conducting a thermal oxidative aging test is equal to or more than 10 days.

23. The biodegradable polyester composition according to claim 4, wherein a $\Delta L$ value of the biodegradable polyester composition is less than 0.80 after the biodegradable polyester composition is digested with 95% ethanol at 40° C. for 240 hours.

* * * * *